Oct. 16, 1951 S. KUSIAK 2,571,259
METHOD OF JOINING ANGULARLY DISPOSED SECTIONS
OF VULCANIZED RUBBER STRIP STOCK
Filed Feb. 14, 1949 2 Sheets-Sheet 1

INVENTOR.
*Stanley Kusiak*
BY
*Evans + McCoy*
ATTORNEYS

Oct. 16, 1951  S. KUSIAK  2,571,259
METHOD OF JOINING ANGULARLY DISPOSED SECTIONS
OF VULCANIZED RUBBER STRIP STOCK
Filed Feb. 14, 1949  2 Sheets-Sheet 2
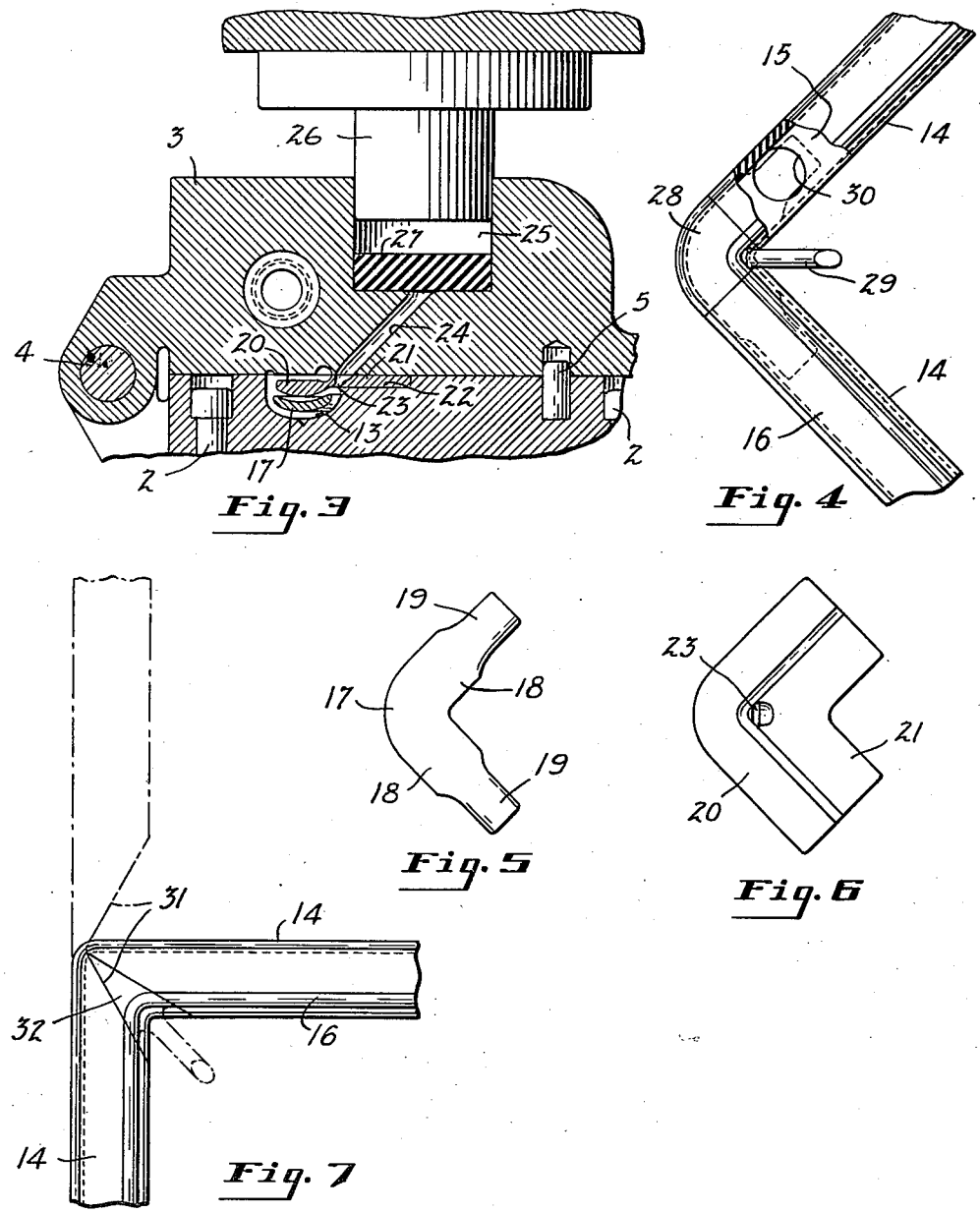
INVENTOR.
Stanley Kusiak
BY
Evans + McCoy
ATTORNEYS

Patented Oct. 16, 1951

2,571,259

UNITED STATES PATENT OFFICE 2,571,259

METHOD OF JOINING ANGULARLY DISPOSED SECTIONS OF VULCANIZED RUBBER STRIP STOCK

Stanley Kusiak, Wabash, Ind., assignor to The General Tire and Rubber Company, Akron, Ohio, a corporation of Ohio Application February 14, 1949, Serial No. 76,316

4 Claims. (Cl. 18—59)

This invention relates to a method of forming the corner joints of refrigerator gaskets and the like that are formed from vulcanized rubber strips.

The corners of such gaskets have heretofore commonly been in the form of cemented mitered joints, but where rounded corners are desired it has been found to be exceedingly difficult to obtain corner joints of the desired flexibility and strength.

The present invention has for an object to provide a method of forming corner joints of the character referred to which are highly flexible and of superior strength.

A further object is to provide a method by which joints with any desired corner curvature can be readily made.

With the above and other objects in view, the invention may be said to comprise the method as illustrated in the accompanying drawings and hereinafter described, together with such variations and modifications thereof as will be apparent to one skilled in the art to which the invention pertains.

Reference should be had to the accompanying drawings forming a part of this specification in which:

Fig. 3 is a fragmentary section similar to Fig. 2, showing the charge of uncured rubber in the injection chamber of the mold and the injection plunger at an intermediate portion of its stroke;

Fig. 4 is a plan view of the corner joint after removal from the mold and before removal of the cores and sprue;

Fig. 5 is a plan view of the elbow core that is formed to fit the interior of the tubular body portion of the strip material;

Fig. 6 is a plan view of the elbow core that fits between the attaching flange and the tubular body portion of the strip material;

Fig. 7 is a plan view of a mitered corner joint formed by the method of the present invention.

Figure 1:
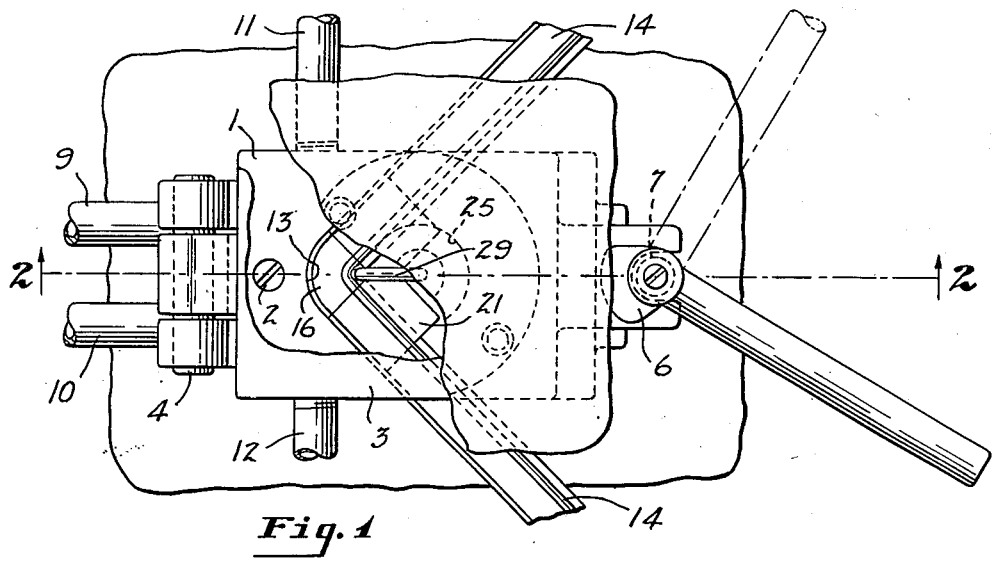
Figure 1 is a top plan view of the injection vulcanizing mold employed in making corner joints by the method of the present invention.

In forming a corner joint by the method of the present invention, a vulcanizing injection mold is employed which has a base 1 secured to a suitable supporting bed by bolts 2 and a cap 3 that is connected to the base by a hinge 4 and positioned on the base when in closed position by dowel pins 5. The cap is clamped to the base by a suitable cam latch 6 that is rotatably mounted on a pin 7 that is hinged to swing on a horizontal pivot 8 so that the latch can be swung bodily into and out of the cap engaging position. The base and cap of the mold are steam heated, the base being provided with suitable passages that are connected to steam pipes 9 and 10 and the cap being provided with passages connected to pipes 11 and 12.

The base 1 and cap 2 have flat meeting faces provided with complementary recesses forming an L-shaped cavity extending across the opposed faces of the base and cap and opening to opposite sides of the mold. Each branch of the L-shaped cavity 13 conforms to the exterior of the strip sections 14 to be joined.

Figure 2:
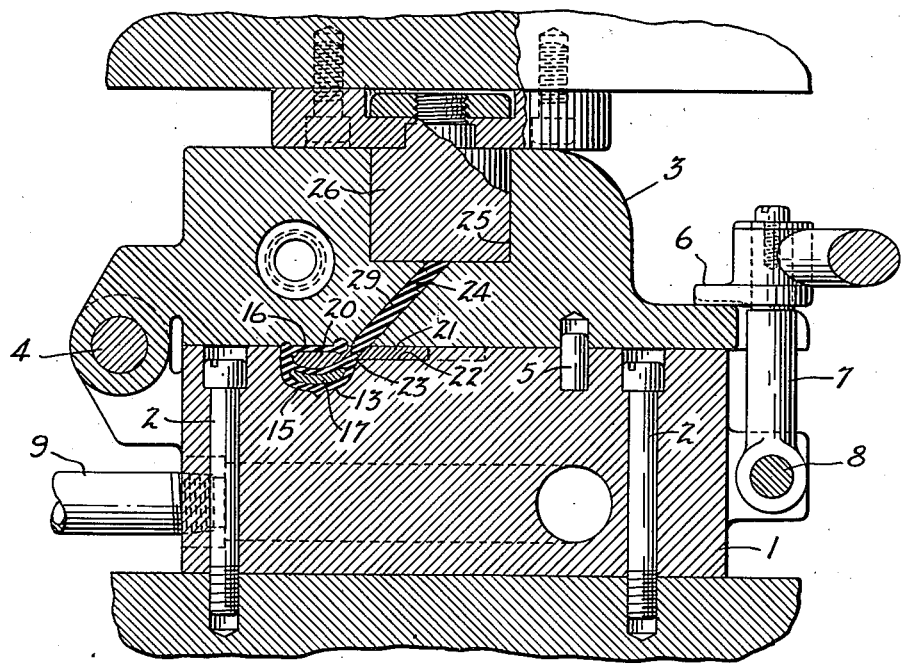
Fig. 2 is a vertical section through the mold taken on the line indicated at 2—2 in Fig. 1.

As shown in Figs. 1 and 2, each strip 14 has a transversely elongated tubular body portion 15 and an attaching flange 16 extending parallel to the body portion and of substantially the same width as the body portion. To position the sections of strip stock to be joined in the mold cavity, an elbow core 17 is provided which has arms 18 shaped to fit within the tubular body 15 of the strip, the core 17 being also provided with end portions 19 of reduced size to facilitate its removal after the molding operation.

Prior to insertion into the mold the ends of the sections of strip stock to be joined are placed on the core 17 with each having an end of its tubular body portion 15 fitting on an arm 18. After assembling the sections to be joined on the core 17, a second elbow core 20 is placed between the adjoining ends of the tubular body portions 15 of the sections and the adjacent flanges 16. The core 20 has a flat projection 21 at its inner side which extends beyond the inner edges of the rubber strip sections 14 and fits within a recess 22 in the top face of the mold base 1 alongside the mold cavity. The sections to be joined are positioned upon the cores 17 and 20 with opposed end edges in alinement and spaced apart, and when the assembly is placed in the mold the end portions of the strip are clamped between the cores and between the cores and the walls of the mold cavity so that the previously vulcanized strips seal the ends of the mold cavity 13 and a molding space is provided between the alined end edges of the sections to be joined. The extension 21 of the core 20 is provided with a hole 23 that opens into the mold cavity between the ends of the clamped strip sections and that registers with a gate 24 formed in the cap 3 which extends to an injection chamber 25. A plunger 26 which may be hydraulically operated is adapted to enter the chamber 25 and force uncured rubber stock from the chamber 25 through the gate 24 and hole 23 into the mold cavity to fill the space between the strip sections to be joined.

As shown in Fig. 3, a disk 27 of uncured rubber is placed in the injection chamber 25 after the strip sections have been assembled in the mold and the plunger 26 is operated to force the uncured rubber through the gate 24 and hole 23 into the mold cavity. The uncured stock forced under heavy pressure through the small passages to the mold cavity is quickly heated and fills the space between the closed ends of the strips to be joined. The material is maintained under heat and pressure for a period of time sufficient to vulcanize the rubber injected into the mold and this rubber is integrally united by the heat and pressure with the ends of the previously cured strip stock which it contacts in the mold, forming a molded vulcanized corner piece 28 having the same cross sectional form as the strip stock and integrally united with the strip stock. Since the uncured material that forms the molded corner piece 28 is quickly and uniformly heated, only a small time is required for vulcanization. After vulcanization the mold is opened and the assembly is removed from the mold. The elbow core 20 is readily removable through the space between the free edge of the flange 16 and the body 15, and an opening 30 may be provided in the portion of the body 15 of one of the sections facing the flange 16 thereof and overlying one of the reduced ends 18 of the core 17 through which the core 17 may be removed.

Where a rounded corner is formed it is preferable to join separate pieces of the strip material, but where a sharp angled corner is formed it is not necessary to entirely sever the sections to be joined. As shown in Fig. 7 an obtuse angled mitered cut 31 may be formed in the strip stock, and a corner piece 32 in the form of a triangular gusset may be molded between the mitered edges. In forming a joint such as shown in Fig. 7, the core members are the same as shown in Figs. 5 and 6 except that they are shaped to conform to an angle joint instead of a rounded joint and the mold cavity is formed to conform to the exterior of the angle joint. In both instances the opposed edges to be joined are connected by an interposed corner piece that is molded and vulcanized under heat and pressure in contact with the edges to be joined.

It is to be understood that in accordance with the provisions of the patent statutes, variations and modifications of the specific devices herein shown and described may be made without departing from the spirit of the invention.

What I claim is:

1. The herein described method of forming the corner joints of elastic rubber refrigerator door gaskets and the like from previously vulcanized tubular strip stock which comprises forming an obtuse angled mitered cut in the strip stock extending through the major portion of the width of the strip, forming an opening in the tubular wall adjacent the cut, placing opposite ends of an elbow core within portions of the tubular strip on opposite sides of the mitered cut to be joined with opposed mitered edges spaced apart exteriorly of the core, clamping the portions to be joined in a heated vulcanizing mold having separable sections with meeting faces recessed to provide a cavity that conforms to the finished corner joint and in which the tubular end portions on said core are clamped to the core, injecting plastic vulcanizable material into said cavity under high pressure to mold a corner-piece between said opposed edges, and subjecting the said vulcanizable material to heat and pressure for a sufficient period of time to vulcanize the same and unite the corner piece to said opposed end edges.

2. The herein described method of joining angularly disposed portions of an elastic rubber refrigerator door gasket or the like that have been vulcanized and that are of identical cross sectional shape, each having a tubular body and an attaching flange spaced from said body, which comprises forming an opening in the tubular body of one of said portions, placing opposite ends of an elbow core in the adjoining tubular body ends with the end edges thereof spaced apart exteriorly of the core, placing a second elbow core between the attaching flanges and tubular bodies to aline and space the ends of said flanges, clamping said cores and portions to be joined in a heated vulcanizing mold having separable sections with meeting faces recessed to provide a cavity that conforms to the finished corner joint, injecting plastic vulcanizable material under high pressure into said cavity to mold a corner piece with tubular and flange portions conforming to and integrally united with the tubular and flange portions of said anglarly disposed portions, removing the gasket from the mold, removing the second core from the space between the tubular body and flange, and removing the first mentioned core through said opening in the tubular body.

3. The herein described method of forming a corner joint in a previously vulcanized tubular elastic rubber strip which comprises mitering a portion of the strip, forming an opening in the tubular wall of the strip adjacent the miter, placing portions of the tubular strip that lie on opposite sides of the miter on the ends of an elbow core with the mitered edges thereof spaced apart on the core, clamping the portions of the strip on the core in a mold having separable sections with angle shaped recesses that conform to the ends of the strip to be joined, injecting plastic vulcanizable material into the mold cavity to fill the same around the core and between said mitered ends, applying heat and pressure to said material to vulcanize the same, removing the joined sections from the mold and removing said core through said opening.

4. The herein described method of joining angularly disposed portions of an elastic refrigerator door gasket or the like that have been vulcanized and that are of identical cross sectional shape, each having a tubular body and an attaching flange spaced from said body, which comprises placing opposite ends of an elbow core in the adjoining tubular body ends with the end edges thereof spaced apart exteriorly of the core, placing a second elbow core between the attaching flanges and tubular bodies to aline and space the ends of said flanges, clamping said cores and portions to be joined in a heated vulcanizing mold having separable sections with meeting faces recessed to provide a cavity that conforms to the finished corner joint, injecting plastic vulcanizable material under high pressure into said cavity to mold a corner piece with tubular and flange portions conforming to and integrally united with the tubular and flange portions of said angularly disposed portions, removing the gasket from the mold, removing the second core from the space between the tubular body and flange, and removing the first mentioned core from the tubular body.

STANLEY KUSIAK.

REFERENCES CITED

The following references are of record in the file of this patent:

UNITED STATES PATENTS

| Number | Name | Date |
| --- | --- | --- |
| 2,178,410 | Tegarty | Oct. 31, 1939 |
| 2,411,398 | Wallace | Nov. 19, 1946 |